United States Patent [19]

Muchalov et al.

[11] Patent Number: 5,628,539
[45] Date of Patent: May 13, 1997

[54] ROBOTIC GRIPPING DEVICE

[75] Inventors: Ivan Muchalov, Erin; Thanh Pham, North York, both of Canada

[73] Assignee: IM Engineered Product Ltd., Brampton, Canada

[21] Appl. No.: 510,692

[22] Filed: Aug. 3, 1995

[51] Int. Cl.⁶ .................................................. B25J 15/00
[52] U.S. Cl. .................... 294/86.4; 294/103.1; 294/902; 414/622; 414/662; 901/39
[58] Field of Search .......................... 294/62, 63.1, 67.1, 294/67.2–67.22, 86.4, 88, 103.1, 902; 269/266; 414/621, 622, 659, 662; 901/30, 31, 37–39

[56] References Cited

U.S. PATENT DOCUMENTS

| | | | |
|---|---|---|---|
| 2,432,182 | 12/1947 | Turner | 414/659 X |
| 2,468,055 | 4/1949 | Gibler | 414/659 X |
| 2,566,863 | 9/1951 | Voigt . | |
| 2,578,802 | 12/1951 | Heidrick et al. | 414/622 |
| 3,292,804 | 12/1966 | Veneman | 414/659 |
| 4,278,395 | 7/1981 | Thunell | 414/659 X |
| 4,896,086 | 1/1990 | Miyahara et al. | 318/568.1 |
| 4,896,914 | 1/1990 | Stevens | 294/88 |
| 5,011,207 | 4/1991 | Stevens | 294/88 |
| 5,042,862 | 8/1991 | Tubke | 294/103.1 X |
| 5,224,586 | 7/1993 | Naka et al. | 198/803.11 |
| 5,364,146 | 11/1994 | Brandorff et al. | 294/103.1 X |

FOREIGN PATENT DOCUMENTS

2583730  12/1986  France ................. 294/67.22

*Primary Examiner*—Johnny D. Cherry
*Attorney, Agent, or Firm*—Donald E. Hewson

[57] ABSTRACT

A robotic gripping device comprises a fixed frame, and a hold down plate vertically moveable in relation to the fixed frame between a raised release position and a lowered hold down position. A moveable support platform retained by the fixed frame is moveable between an extended position where the support platform is opposed to the hold down plate to permit the retention of packages therebetween, and a retracted position where the support platform is no longer opposed to the hold down plate. The support platform further comprises pairs of generally parallel side members, with roller members disposed between each pair of side members, and a belt member looped around the roller members. A package receiving portion of the belt member faces the hold down plate when the support platform is in its extended position. A securing member disposed between the fixed frame and a fixed end portion of each belt member, so as to thereby secure a fixed end portion of the package receiving portion of the belt member in horizontally stationary relation with respect to the hold down plate. Accordingly, the segment of the package receiving portion of the belt member remains horizontally stationary during horizontal movement of the support platform, thus allowing easy removal of the support platform from beneath a package. Further, the hold down plate has a plurality of dynamically activated ring-shaped entrapment members that help preclude undesired lateral movement of a package.

21 Claims, 6 Drawing Sheets

FIG. 11

ROBOTIC GRIPPING DEVICE

FIELD OF THE INVENTION

This invention relates to robotic arms and more particularly to gripping devices, such as hands, for such robotic arms.

BRIEF DESCRIPTION OF THE DRAWINGS

Embodiments of this invention will now be described by way of example in association with the accompanying drawings in which.

BACKGROUND OF THE INVENTION

Robots are used extensively to load packages onto a shipping palette in a particular predetermined pattern. Such packages are typically picked up from a filling line, assembly line, or the like, and are deposited in a predetermined pattern on a shipping palette or similar. These packages may include boxes, which are of a regular shape, or may include irregularly shaped packages such as jars or cans retained in a grid arrangement of perhaps a dozen jars or cans, with an apertured plastic sheet being tightly engaged sound the top portion of the jars or cans, or may include bags, which may be of a somewhat indeterminate shape.

If a package is of a suitable shape and is made of a suitable material, often a suction cup type of robotic gripping device, operatively mounted on the end of a robotic arm, will be used to handle the package; however, very often this is not the case, and a clamp type gripping device is used. Such a clamp type gripping device, which is shown in a first embodiment in FIGS. 1 and 2, and in a second embodiment in FIG. 3, and is indicated by the general reference numeral 20, is mounted on the end of a robotic arm (not shown) and typically has a horizontally moveable U-shaped support element 27, which support element 27 comprises a generally horizontally disposed upper mounting bracket 22, a generally horizontally disposed lower support platform 24, and a generally vertically disposed interconnecting member 26 securely attached in space retaining relation to each of the upper mounting bracket 22 and the lower support platform 24. The upper mounting bracket 22 is slidably mounted on a generally horizontally disposed fixed frame 25 so as to be securely retained in load bearing relation thereby. The U-shaped moveable support element 27 moves horizontally with respect to the fixed frame 25 in opposed first and second directions along an axis of movement between a first extended position and a second retracted position, as will be discussed in greater detail subsequently.

Figure 1:
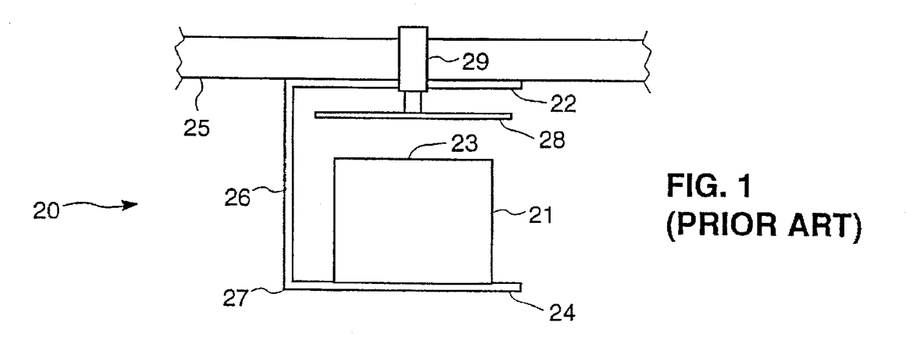
FIG. 1 is a side elevational view of a first prior art robotic gripping device, employing a simple flat hold down plate shown in a raised position.
Figure 2:
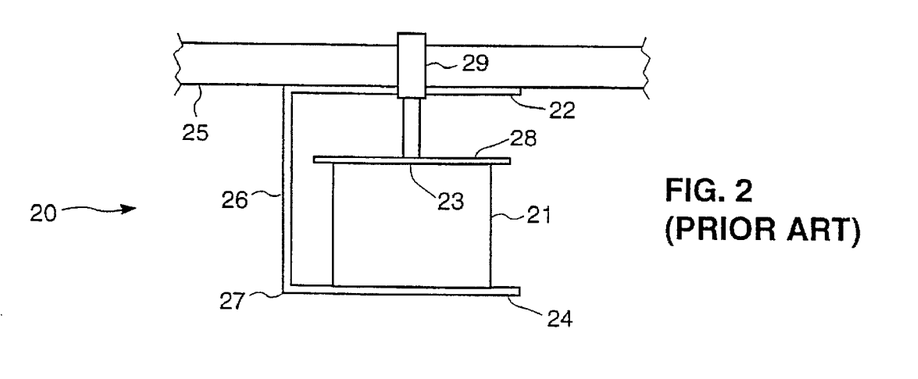
FIG. 2 is a view similar to FIG. 1, with the hold down plate shown in a lowered position so as to contact a package.

A vertically moveable hold down plate 28 is operatively retained by the upper mounting bracket 22 in vertically displaceable relation thereto between a first raised release position and a second lowered hold down position. When the lower support platform 24 is in its first extended position, it is disposed in opposed spaced apart relation with respect to the hold down plate 28, so as to thereby permit the selective retention of a package 21. When the lower support platform 24 is in its second retracted position, it is no longer in opposed relation to the hold down plate 28 and retention of the package 21 therebetween is not possible. The package 21 is securely retained between the hold down plate 28 and the lower support platform 24 when the hold down plate 28 is in its second lowered hold down position and when the lower support platform 24 is in its extended position.

In use, the package is picked up by the clamp type gripping device 20 from a pick-up point on a filling line, assembly line, or the like. The U-shaped support element 27 first surrounds the package 21 and then the gripping device 20 is raised such that the lower support platform 24 essentially lifts the package. The hold down plate 28 is then moved vertically downwardly, preferably by way of a pneumatic piston 29, so as to come into intimate contact with the top surface 23 of the package 21. The package 21 is then gripped between the lower support platform 24 and the hold down plate 28, while the package is rapidly moved between the pick-up point and a destination point on a shipping palette (not shown) by the robotic arm. After the robotic arm has positioned the package 21 into its proper place on the palette, U-shaped support element 27 is retracted horizontally so as to remove the lower support platform 24 from underneath the package 21.

In order to keep the package 21 in its proper place on the palette, the hold down plate 28 must hold the package 21 while the lower support platform 24 is retracted. It is important that the package 21 remains in its proper position during unloading by the gripping device 20 as palettes must be packed quite accurately. It has been found that it is not uncommon to require in the order of sixty pounds of downward force by the hold down plate 28 in order to keep a package 21 in place while being unloaded onto a palette. Unfortunately, having such a high downward force on the package 21 tends to cause a great deal of friction between the package 21 and the bottom support plate 24, which friction makes it more difficult to retract the U-shaped support element 27 in a horizontal direction out from under the package 21. The higher the friction between the lower support platform 24 and the package 21, the greater the tendency for the lower support platform 24 to pull the package out of its proper place on the palette when the U-shaped support element 27 is being retracted horizontally. Accordingly, a greater hold down force is required on the package 21 from the hold down plate 28. In other words, this system is essentially self-defeating and obviously does not work well.

Figure 3:
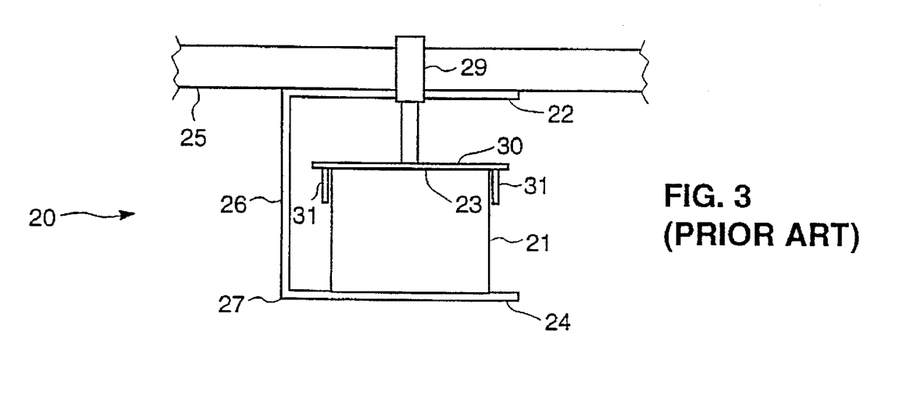
FIG. 3 is a side elevational view of a second prior art robotic gripping device, with a "dedicated" hold down plate shown in a lowered position.

Furthermore, many types of packages 21 are somewhat delicate, and are not acceptable to a customer if the package 21 becomes damaged during shipping. It is therefore preferable to minimize the force of the hold down plate 28 on the top of the package 21. This minimization can be accomplished by using a "dedicated" hold down plate 30, as shown in FIG. 3, which hold down plate 30 includes brackets 31, of a predetermined size and shape, depending from the hold down plate 30. The brackets 31 are spaced apart by a distance slightly greater than the dimension across the respective portion of the package 21, so that the brackets 31 are disposed around the perimeter of the package 21. The brackets 31 preclude lateral movement of the package 21 during the horizontal retraction of the U-shaped support element 27. A low downward force—perhaps in the order of from about five pounds to ten pounds—is applied by the hold down plate 28 on the top surface 23 of the package 21, when the package 21 is being moved by the robotic arm. Virtually no downward force is required to offset the frictional pulling due to the horizontal retraction of the bottom support plate 24 during the subsequent depositing of the package 21.

Unfortunately, there are problems associated with such "dedicated" hold down plates 28. If a package 21 is slightly out of place when it is picked up by the robotic gripping device 20, then the depending bracket members 30 can easily crush or puncture the package 21. Further, this type of dedicated hold down plate 28 may be used for only one size and shape of package 21 only, with virtually no variance allowed, and generally cannot be successfully used with packages such as bags. It is therefore necessary to change either the entire hold down plate 28, or at least the bracket member 30, whenever a different size or shape of package 21 is to be manipulated. Such changeover tends to be inconvenient and expensive and causes unwanted down-time.

Another way to reduce the tendency of the bottom support plate 24 from pulling the package 21 out of its proper place on the palette during horizontal retraction of the lower support platform 24 is to reduce the friction between the lower support platform 24 and the package 21. It would therefore be desirable to have an extremely low friction interface between the support plate 24 and the package 21. However, a very low friction interface, such as rollers, would tend to cause problems during movement of the robotic arm between its pick-up point and destination point. During this time, the robotic arm tends to move at quite a high speed in order to maximize the number of packages that can be transferred per unit of time. Such high speeds are achieved by way of quick accelerations of the robotic arm. Accordingly, the gripping device 20 on the robotic arm must transmit relatively high accelerative forces to the package 21 by way of the hold down plate 28 and the bottom support plate 24. It is therefore undesirable to have a low friction interface between the support plate 24 and the package 21 during the time that the robotic arm is moving between its beginning and its end positions as the package 21 would tend to slip from its proper position in the gripping device 20.

Further, if rollers are used as a low friction interface between a support plate, and a package, then it is extremely difficult to transport and generally handle bags, such as bags of sugar or flour, or the like, or to handle packages having irregularly shaped bottom surfaces. Also, problems are typically encountered in the handling of packages having shrink wrap thereon, which shrink wrap would tend to be warm and therefore somewhat tacky. Accordingly, the shrink wrap would tend to become stuck to the rollers or become damaged by the rollers.

What is needed is a support plate having an interface that exhibits properties of relatively high friction when the robotic arm is moving and exhibits properties of relatively low friction when the robotic arm is depositing the package at its destination, such as onto a palette, or even when picking up the package. Further, the support plate should be able to readily handle bags of various sizes and weights.

What is also needed is a hold down plate that exhibits the ability of readily precluding a package from moving laterally on the U-shaped support element, while exerting only a minimal downward force and without being a dedicated hold down plate.

PRIOR ART

No specific prior art is known relating to improvement in the design of "non-dedicated" hold down plates, for precluding the lateral movement of a package being retained between a hold down plate and a lower support platform during movement of the robotic arm, and also for concurrently providing a low friction interface on a support platform for permitting ready depositing of a package therefrom. However, various prior art patents are known which teach various methods and apparatus for precluding lateral movement of object in various situations, and are discussed below.

U.S. Pat. No. 4,896,086 to MIYAHARA et al discloses a method and apparatus for positioning workpiece to a pallet, wherein various sizes and shapes of workpieces are each positioned by way of a selected single one of three extendible positioning pins protruding upwardly from the working table. Each of the pins engages a co-operating predetermined positioning hole within the workpiece. The teachings of this patent are only slightly related to the present invention.

U.S. Pat. No. 4,896,914 to STEVENS discloses a robotic hand with shape determination capabilities, wherein a plurality of controllably moveable finger units are deployed from a central housing. The finger units are moved towards an object until the tips of the finger units contact the object, so as to define the general shape of the object. There is means for measuring the distance each finger unit travels, thereby providing a three-dimensional co-ordinate of the contact point between each finger unit and the object. The information obtained from the distance measuring systems is processed in a computer to determine the actual shape and other shape parameters of the object. Again, the device taught in this patent is only slightly related to the present invention.

U.S. Pat. No. 5,224,586 to NAKA et al discloses a container positioning apparatus, having an outer casing and an inner rotatable disk-shaped portion. Co-rotatable with the disk-shaped portion is a container receptacle 62, which moves vertically along connecting pins and is biased upwardly by a spring. A plurality of pins extend upwardly from the disk-shaped portion through apertures in the container receptacle. The pins are biased upwardly by springs. When a container is placed on the container receptacle, the container receptacle is thereby moved to its lowest position. Any pins immediately under the container are also pushed downwardly to their lowest position. Any pins that are outside the shape of the container remain at their highest position so as to thereby define a shape that generally conforms to the shape of the container. It can therefore be seen that the general principle of having a plurality of moveable pin members or the like that define the outer shape of an object, and which generally horizontally retain that object, is known.

U.S. Pat. No. 2,566,863 to VOIGT discloses a load retaining means for industrial vehicles. As shown, the load retaining means is mounted above the forks of a fork lift truck. The load retaining means has a horizontally disposed large platform with a plurality of holes therein. An elongate vertically slidable headed pin is retained in each of these holes for vertical sliding movement between a raised position and a lowered position. When the platform is moved to its lowered position, some of the headed pins strike a load on the forks of the fork lift truck and accordingly lift upwardly. Those pins which do not strike the load will remain in their lowermost position and confine the load in horizontal sense.

SUMMARY OF THE INVENTION

In accordance with one aspect of the present invention, there is provided a robotic gripping device for gripping, manipulating, placing, and releasing articles of various shapes and sizes. The gripping device comprises a fixed frame, a hold down plate operatively retained by the fixed frame in vertically displaceable relation thereto between a first raised release position and a second lowered hold down position, a moveable support platform having a first end and a second end, and being retained in load bearing relation by the fixed frame so as to be moveable in opposed first and second directions along an axis of movement between a first extended position where the moveable support platform is opposed to the hold down plate in spaced apart relation thereto so as to thereby permit the retention of articles therebetween, and a second retracted position where the moveable support platform is no longer opposed to the hold down plate so as to thereby no longer permit the retention of articles therebetween. There is at least one first roller member disposed at the first end of the platform for rotation about a first axis of rotation oriented generally transversely to the axis of movement of the support platform, and at least one second roller member disposed at the second end of the platform for rotation about a second axis of rotation oriented generally transversely to the axis of movement of the support platform. A belt member is operatively retained on the first and second roller members in looped relation therearound, the belt member having an article receiving portion that generally faces the hold down plate when the support platform is in its first extended position. A securing member is secured at one end thereof to the fixed frame and secured at its opposite other end thereof to a fixed end portion of the article receiving portion of the belt member, so as to thereby secure the fixed end portion of the article receiving portion of the belt member in horizontally stationary relation with respect to the hold down plate. The segment of the article receiving portion of the belt member that is facing the hold down plate thereby remains horizontally stationary during horizontal movement of the support platform.

DETAILED DESCRIPTION OF THE PREFERRED EMBODIMENTS

Reference will now be made to FIGS. 4 through 12, which show the robotic gripping device of the present invention, as indicated by general reference numeral 40. This robotic gripping device 40 is for gripping, manipulating, placing, and releasing packages 42 of various shapes and sizes, including indeterminate shapes and sizes, which packages 42 may be boxes, bags, and irregularly shaped objects such as jars or cans contained in a grid arrangement with an apertured plastic sheet being tightly engaged around the top portion of the jars or cans.

The robotic gripping device 40 comprises a generally horizontally disposed fixed frame 44, which fixed frame 44 is disposed at the top of the gripping device 40. The fixed frame 44 is secured in operative relation to the end of a robotic arm (not shown) and is, therefore, moveable with the robotic arm between a pick-up point, whereat the gripping device 40 picks up a package 42 from a filling line, assembly line, or the like, and a destination point, whereat the package 42 is delivered to a palette or the like. The fixed frame 44 is generally fixed with respect to the robotic arm and provides a fixed reference frame. A number of pneumatic lines and electrical wires, which lines and wires are not shown in the Figures for the sake of clarity, are received and retained by the fixed frame 44. The fixed frame 44 is preferably made from a relatively light and strong material such as aluminum or aluminum alloy, as a gripping device 40 must be as light as possible in order to make possible rapid acceleration and deceleration and also to make it possible for the robotic arm to support the gripping device 40 without the use of any auxiliary support means.

Figure 7:
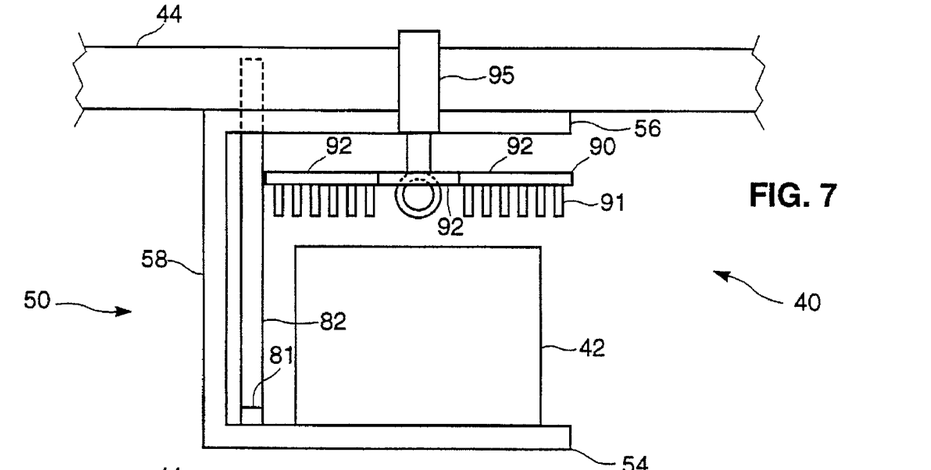
FIG. 7 is a simplified side elevational view of the robotic gripping device of FIG. 4, with the hold down plate in a raised release position and about to retain a package.
Figure 8:
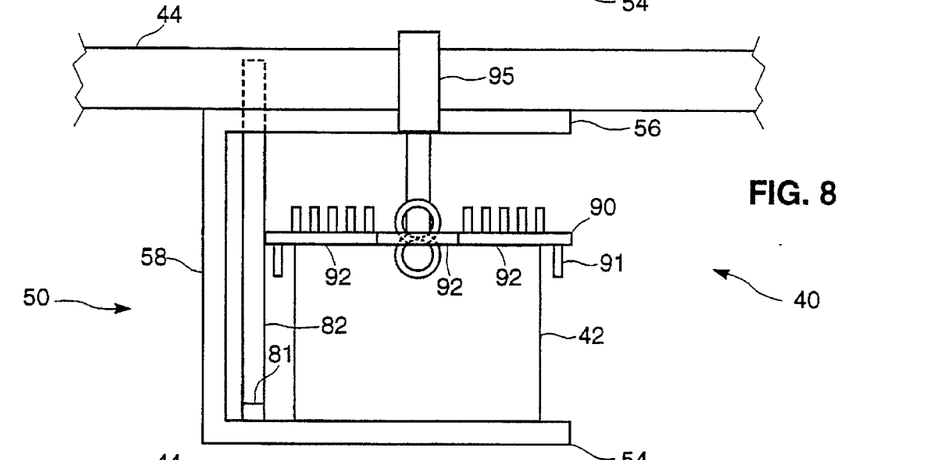
FIG. 8 is a simplified side elevational view similar to FIG. 7, with the hold down plate in a lowered hold down position.
Figure 9:
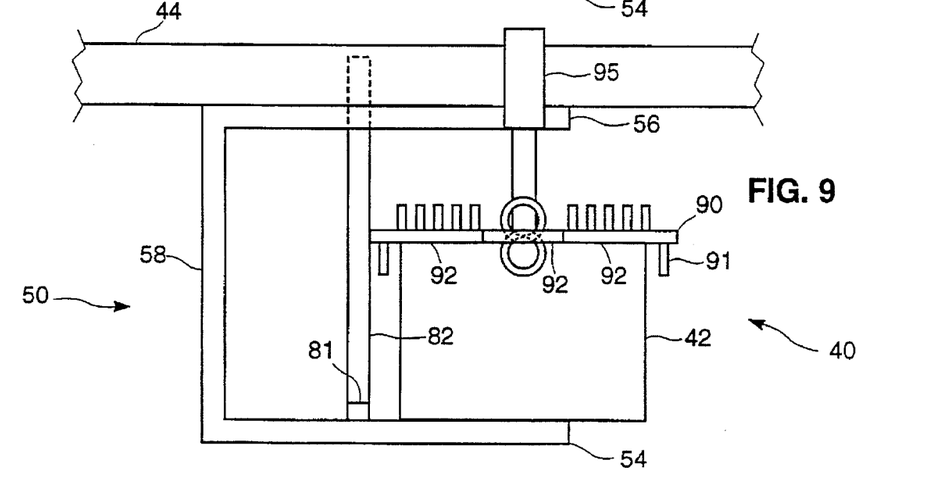
FIG. 9 is a simplified enlarged side sectional view similar to FIG. 7, with the support plate being partially retracted while depositing a package on a palette.

A hold down plate 90 is operatively retained by the fixed frame 44 in vertically displaceable relation thereto between a first raised release position, as is best shown in FIG. 7, and a second lowered hold down position, as is best shown in FIG. 8, by means of a pneumatically actuated piston 95. It will be understood that the pneumatically actuated piston 95 could be replaced by a hydraulically actuated piston.

Figure 4:
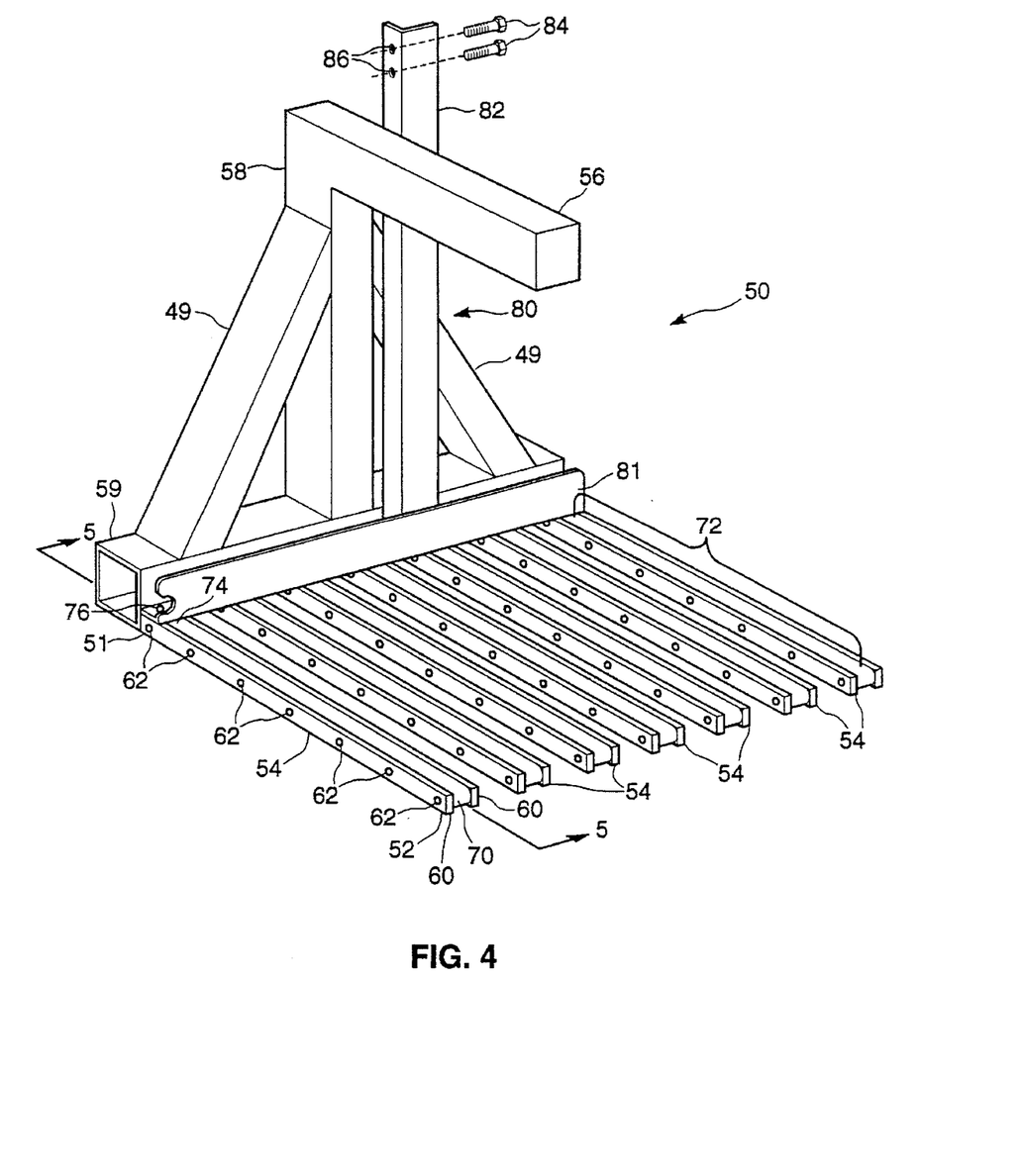
FIG. 4 is a perspective view of the U-shaped support element of the robotic gripping device of the present invention.

A U-shaped support element 50 comprises a moveable support platform 54 that is designed to support packages 42 thereon, a generally horizontally disposed upper mounting bracket 56 slidably mounted on the fixed frame 44 so as to be retained in load bearing relation by said fixed frame 44, and a generally vertically disposed interconnecting member 58 attached in space retaining relation to each of the upper mounting bracket 56 and the support platform 54. In the preferred embodiment, the support platform 54 comprises a plurality of support platforms 54, with each of the plurality of support platforms 54 being secured at their respective first ends 51 to a common base 59 so as to securely join the moveable support platforms 54 one to another. The generally vertically disposed interconnecting member 58 and the common base 59 are reinforced with respect to each other by way of two bracing members 49. The plurality of moveable support platforms 54 move in conjunction one with another along the first axis of movement "M" in opposed first and second directions. Each of the support platforms 54 is shaped and dimensioned for fitment between the rollers of a roller type conveyor so as to allow the support platform 54 to pick-up a package 42 from a roller type conveyor. In the preferred embodiment, there are seven support platforms 54, but any number of support platforms 54 is acceptable. Each of the support platforms 54 works in the same manner as the others.

The U-shaped support element 50 is moveable in opposed first and second directions along a generally horizontal axis of movement "M" between a first extended position where the moveable support platforms 54 are opposed to the hold down plate in spaced apart relation thereto so as to thereby permit the retention of packages 42 therebetween, and a second retracted position where the moveable support platforms 54 are no longer opposed to the hold down plate so as to thereby no longer permit the retention of packages 42 therebetween.

Figure 5:
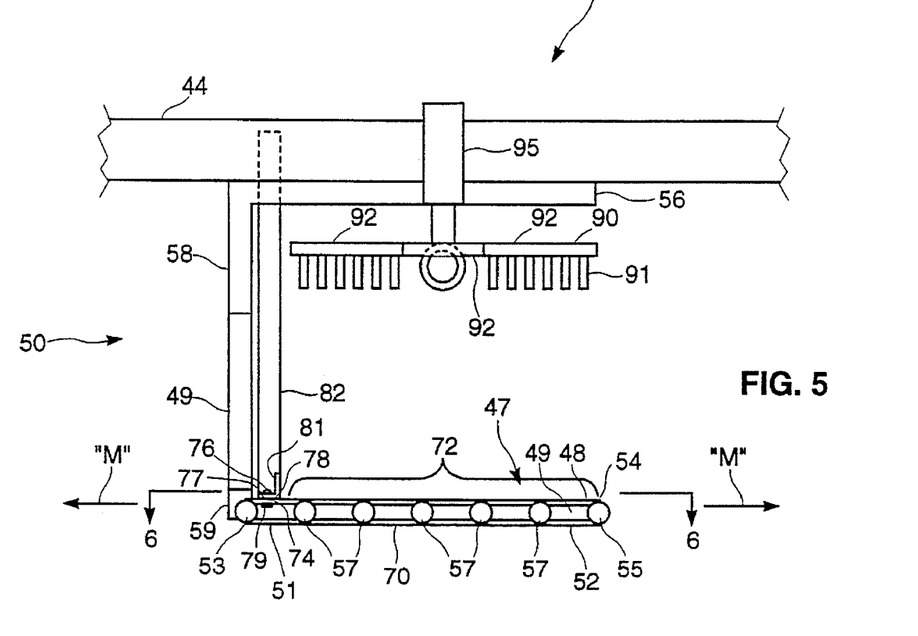
FIG. 5 is an enlarged side elevational view of the robotic gripping device of FIG. 4 with the support platform shown in section, taken along section line 5—5 of FIG. 4.

The support platforms 54 have a first end 51 whereat a first roller member 53 is disposed for rotation about a first axis of rotation, and a second end 52 whereat a second roller member 55 is disposed for rotation about a second axis of rotation. There should be at least one intermediate roller member, and preferably about five intermediate roller members 57, disposed between the first and second rollers members 53 and 55 for rotation about a corresponding axis of rotation oriented generally transversally to the axis of movement of the support platforms 54. Preferably, the axis of rotation of each of the first and second roller members 53 and 55 is parallel one to the other and, in the preferred embodiment, also horizontal. Optionally, a tensioning member 47 comprising a spring 48 in compression mounted between each second roller member 55 and a corresponding seat 49 may be used to keep the respective belt member 70 in tension.

Figure 6:
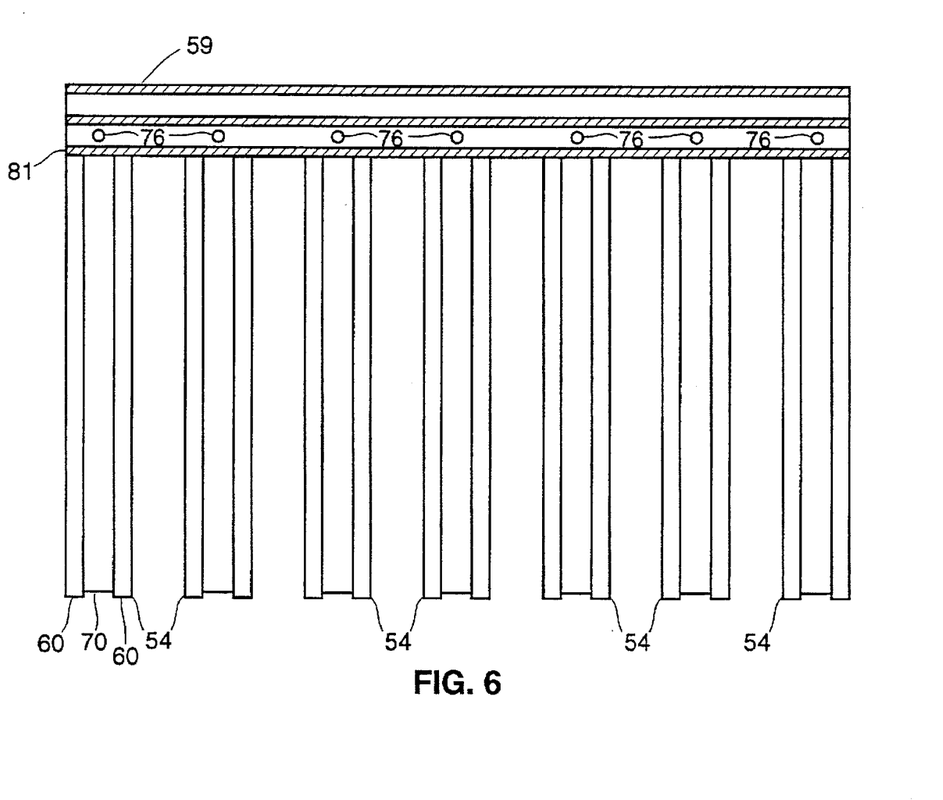
FIG. 6 is a sectional top plan view of the support plate of the robotic gripping device of FIG. 4, taken along section line 6—6 in FIG. 5.

The moveable support platforms 54 further comprise two generally parallel side structural members 60, which structural members 60 are retained in spaced apart relation one to the other so as to accommodate the first and second roller members 53 and 55 and the intermediate roller members 57 therebetween. The first and second roller members 53 and 55 and the intermediate roller members 57 are preferably removably mounted by way of removable and replaceable pin members 62, or the like.

A belt member 70 in the form of a continuous loop is operatively retained on the first and second roller members 53 and 55 in looped relation therearound. Each moveable support platform 54 has its own belt member 70. Each belt member 70 has a package receiving portion 72 that generally faces the hold down plate when the support platforms 54 are in their first extended position. The intermediate roller members 57 support the package receiving portion 72 of the looped belt along its length. A conventional spring-and-roller type tensioning mechanism (not shown), is operatively mounted with respect to the belt member 70 so as to keep the belt member 70 taut, thereby keeping the belt member 70 engaged on the first and second roller members 53 and 55.

A securing member 80 comprises a vertically disposed metal bar 82 secured at one end thereof to the fixed frame 44 by way of threaded fasteners 84 engaged in co-operating apertures 86. Secured to the other end of the vertically disposed metal bar 82, preferably by way of welding, is a horizontally disposed metal bar 81, which is also secured to a fixed end portion 74 of the package receiving portion 72 of each of the belt members 70 by way of threaded fasteners 76 passing through co-operating apertures (not shown) and also passing through co-operating eyelets 77 in the belt members 70 so as to be retained in place by nuts 79. In this manner, the fixed end portion 74 of the package receiving portion 72 of each of the belt members 70 is secured in horizontally stationary relation with respect to the hold down plate and, therefore, remains horizontally stationary even when the U-shaped support element 50 moves horizontally.

It can be seen that, in use, the entire package receiving portion 72 of each belt member 70 faces the hold down plate. The fixed end portion 74 of the belt member 70 faces the hold down plate at all times and also remains horizontally stationary at all times, with respect to the fixed frame 44, since the fixed end portion 74 is secured to the fixed frame 44. During horizontal movement of the support platform 54, such as retraction of the support platform 54, the belt member 70 travels around the first and second roller members 53 and 55 and the intermediate roller members 57. During retraction of the U-shaped support element 50, the package receiving portion 72 of the belt member 70 progressively tracks downwardly around the second roller member 55 so as to subsequently reach the bottom of the respective support platform 54 and thus be facing away from the hold down plate. The segment 78 of the belt member 70 that is disposed between the second roller member 55 and the securing member 80—which segment changes in size with horizontal movement of the U-shaped support element 50—does not move horizontally with respect to the fixed frame 44 and, therefore, with respect to the hold down plate, at least while that segment remains facing the hold down plate. Accordingly, this segment of the package receiving portion 72 does not move horizontally with respect to the package 42 that is being supported by the support platforms 54, as the package 42 is being deposited. The belt member 70 merely "falls away" from the package 42 around the second roller member 55 as the U-shaped support element 50, and thus the support platforms 54, are horizontally retracted. Since this segment of the belt is the only portion of the belt that is in contact with the package 42, the package 42 is not urged horizontally by the support plate during retraction of the support plate.

It has been found that this type of robotic gripping device 40, as described above, is highly effective in depositing packages 42 in a desired point on a palette, and is especially useful for handling shrink wrap type packages 42 as they exhibit very high frictional properties when warm.

It should also be noted that the above described operation of the belt members 70 in conjunction with the support platforms 54 also applies in an analogous, but directionally reversed, sense, when loading a package onto the support platforms 54.

In an alternative embodiment, it is envisioned that the belt members could also be in the form of a chain, among other choices.

As can best be seen in FIGS. 9 through 12, the hold down plate 90 has a multiplicity of dynamically actuated entrapment members 91 mounted thereon. It has been found that having one entrapment member 91 located juxtaposed to each of the four sides of the package 42 is sufficient. Resultingly, the hold down plate 90 is "+"-shaped. Each of the arms 92 of the "+"-shaped hold down plate 90 has a plurality of dynamically actuated entrapment members 91 mounted thereon spaced about 0.5 cm or so apart along the outer portion of the length of each arm 92. Each of the dynamically actuated entrapment members 91 is essentially a 0.5 cm thick ring of plastic material—preferably DELRIN®—and is loosely mounted around a central pin member 93, which pin member 93 is generally centrally mounted within a laterally directed slot 94 in the respective arm member 91 in co-operating apertures 96 in the side walls 98 of the slot 94. The dynamically actuated entrapment members 91 are only slightly narrower than the width of the slots 94, and they are of a preferred outside diameter of about 2 cm to 4 cm, about 1 cm less than the length of the slot 94.

Figure 10:
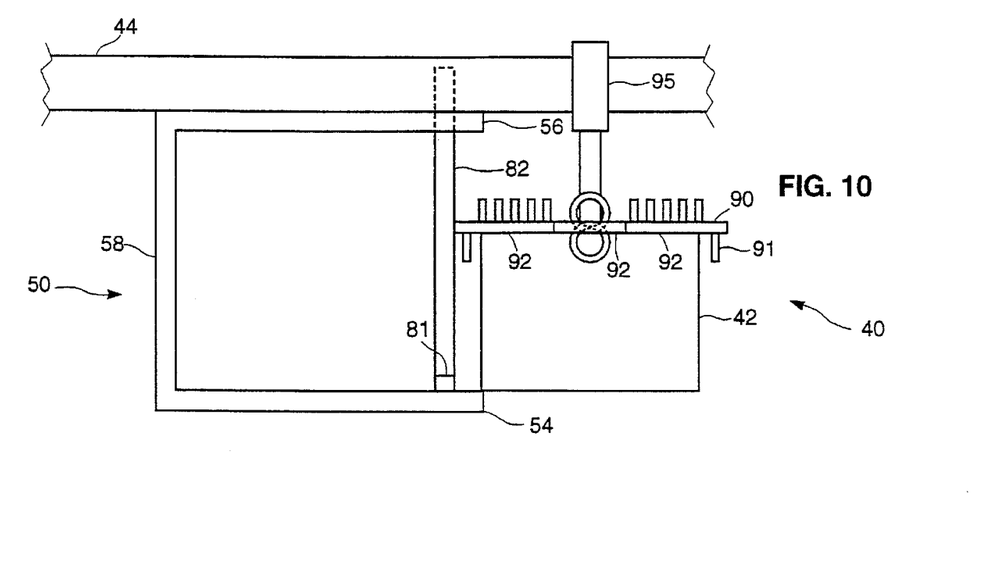
FIG. 10 is a simplified view similar to FIG. 7, with the support plate of the robotic gripping device having been retracted even further.
Figure 11:
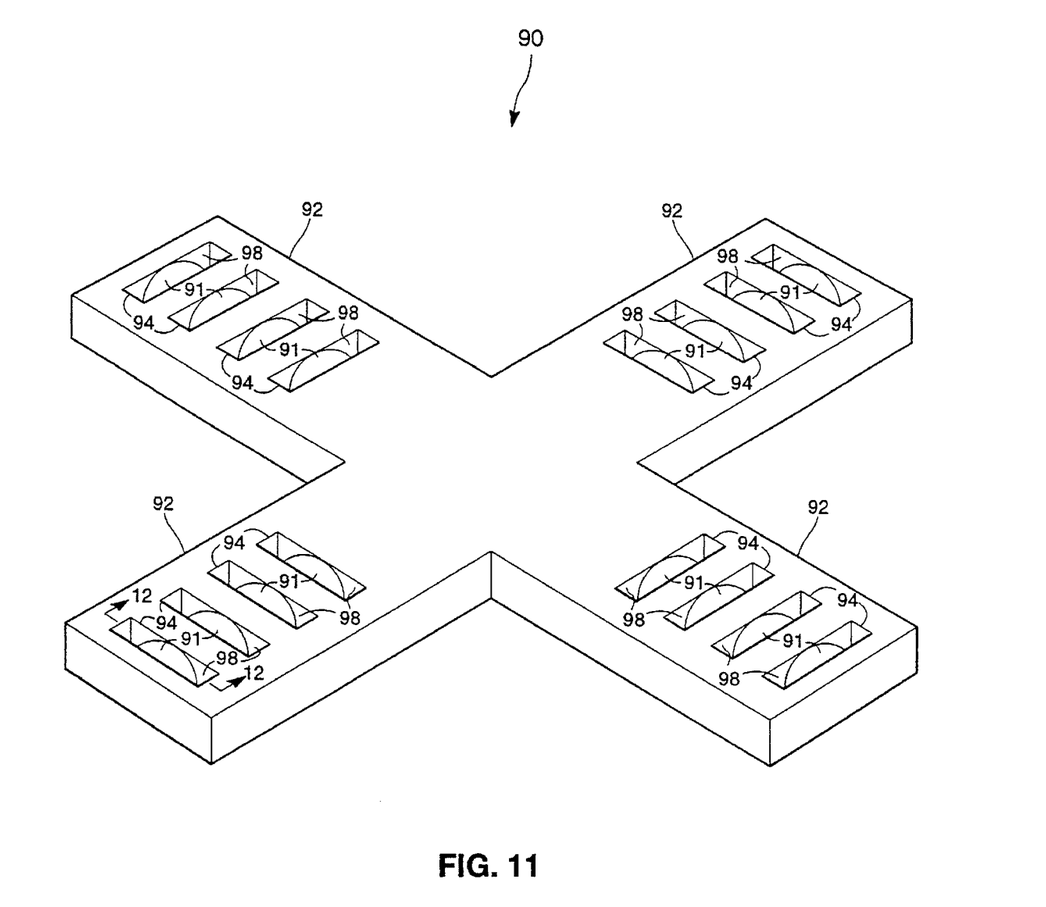
FIG. 11 is a perspective view of the hold down plate of the robotic gripping device of FIG. 4.
Figure 12:
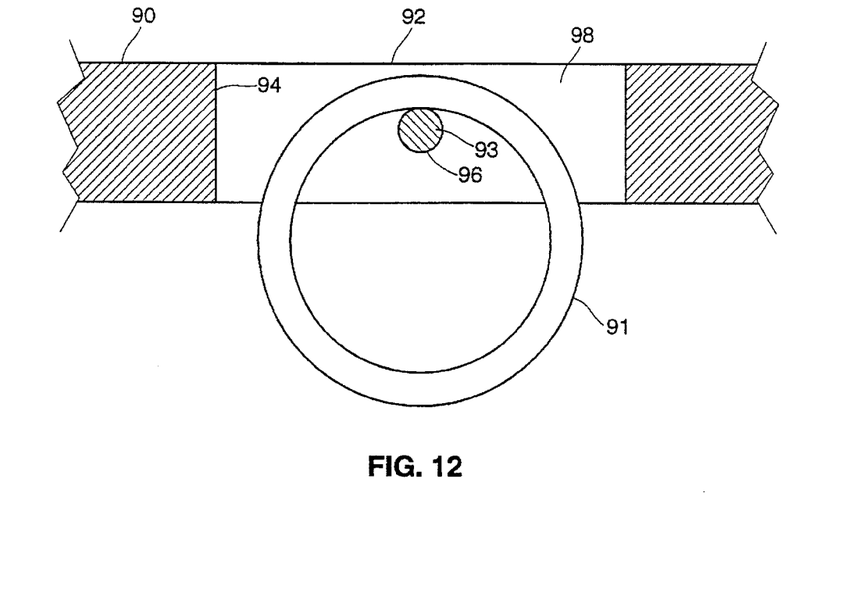
FIG. 12 is a greatly enlarged sectional view of a portion of the hold down plate of FIG. 4, taken at section line 12—12 of FIG. 11.

The dynamically actuated entrapment members 91 can readily move in a vertical direction, and also to some degree in the direction of the length of the slot 94; however, the entrapment members 91 can move only marginally in a direction across the slot 94. In this manner, the dynamically actuated entrapment members 91 extend downwardly from the hold down plate 90 when not in contact with the package 42. As the hold down plate 90 reaches the package 42, the dynamically actuated entrapment members 91 that contact the package 42 are forced upwardly by the package 42, so as to extend above the hold down plate 90. The entrapment members 91 raised in this manner generally cannot preclude lateral movement of the package 42 on the support platforms 54. The other entrapment members 91—the ones adjacent the package 42—do not touch the package 42, and are not raised by the package 42. These entrapment members 91 depend downwardly to a level of perhaps about 1 cm to about 2 cm below the top of the package 42. In this manner, lateral movement of the package 42 in any direction is precluded by the four depending entrapment members 91 that are juxtaposed the sides of the package 42 as is best seen in FIG. 10.

There might be, however, a small amount of clearance between the side of the package 42 and the adjacent entrapment members 91. It can be seen that virtually no downward force—or at least minimal downward force—from the hold down plate 90 is necessary in order to retain the package 42 in place when retracting the support platforms 54.

This type of hold down plate can also be made in the form of a square or rectangle instead of a "+", with a large number of dynamically actuated entrapment members mounted thereon, possibly arranged in a herringbone pattern so as to be usable with irregular shaped packages, or packages having top surfaces of varying heights.

Further, it is envisioned that in an alternative embodiment, the hold down plate might have dynamically actuated entrapment members in the form of vertically slidable pins or similar. It has been found, however, that an embodiment having vertically slidable pins does not work quite as well as the preferred embodiment.

It is also envisioned that a similar type of hold down plate could be used in conjunction with forklifts, for entrapping an entire palette of goods, or perhaps on an manned shuttle train in a factory, where lack of human supervision of the travel of the shuttle train tends to lead to packages falling off unwantedly.

Other modifications and alterations may be used in the design and manufacture of the apparatus of the present invention without departing from the spirit and scope of the accompanying claims.

What is claimed is:

1. A robotic gripping device for gripping, manipulating, placing, and releasing packages of various shapes and sizes, said gripping device comprising:

a fixed frame;

a hold down plate operatively retained by said fixed frame in vertically displaceable relation thereto between a first raised release position and a second lowered hold down position;

a moveable support platform having a first end and a second end, and being retained in load bearing relation by said fixed frame so as to be moveable in opposed first and second directions along an axis of movement between a first extended position where said moveable support platform is opposed to said hold down plate in spaced apart relation thereto so as to thereby permit the retention of packages therebetween, and a second retracted position where said moveable support platform is no longer opposed to said hold down plate so as to thereby no longer permit the retention of packages therebetween;

at least one first roller member disposed at said first end of said platform for rotation about a first axis of rotation oriented generally transversely to said axis of movement of said support platform;

at least one second roller member disposed at said second end of said platform for rotation about a second axis of rotation oriented generally transversely to said axis of movement of said support platform;

a belt member operatively retained on said first and second roller members in looped relation therearound, said belt member having a package receiving portion that generally faces said hold down plate when said support platform is in its first extended position; and a securing member secured at one end thereof to said fixed frame and secured at its opposite other end thereof to a fixed end portion of said package receiving portion of said belt member, so as to thereby secure said fixed end portion of said package receiving portion of said belt member in horizontally stationary relation with respect to said hold down plate;

whereby the segment of said package receiving portion of said belt member that is facing said hold down plate, remains horizontally stationary during horizontal movement of said support platform.

2. The robotic gripping device of claim 1, wherein said support platform is part of a U-shaped support element, which U-shaped support element further comprises a generally horizontally disposed upper mounting bracket slidably mounted on said fixed frame and a generally vertically disposed interconnecting member attached in spaced retaining relation to each of said upper mounting bracket and said support platform.

3. The robotic gripping device of claim 1, further comprising at least one intermediate roller member disposed between said first and second roller members for rotation about a corresponding axis of rotation oriented generally transversely to said axis of movement of said support platform.

4. The robotic gripping device of claim 3, wherein the axes of rotation of each of said roller members is substantially parallel one to another.

5. The robotic gripping device of claim 1, wherein said axis of movement of said support platform is generally horizontal.

6. The robotic gripping device of claim 5, wherein the axes of rotation of each of said roller members is substantially horizontal.

7. The robotic gripping device of claim 1, wherein said moveable support platform further comprises two generally parallel side members, with said first and second roller members being disposed in operative relation between said two side members.

8. The robotic gripping device of claim 1, wherein said moveable support platform comprises a plurality of moveable support platforms, with each of said plurality of moveable support platforms being secured at their respective proximal ends to a common base such that said plurality of moveable support platforms move in conjunction with one another, and wherein each of said plurality of moveable support platforms has its own belt member.

9. The robotic gripping device of claim 8, wherein each of said support platforms is shaped and dimensioned for fitment between the rollers of a roller type conveyer.

10. The robotic gripping device of claim 9, wherein the number of moveable support platforms is seven.

11. The robotic gripping device of claim 8, wherein said securing member comprises a vertically disposed metal bar, and a horizontally disposed metal bar secured to said first vertically disposed metal bar and also secured to each of the belt members.

12. The robotic gripping device of claim 11, wherein said horizontally disposed metal bar is secured to said belt members by way of threaded fasteners extending through an aperture in each respective one of said belt members.

13. The robotic gripping device of claim 1, further comprising a tensioning member co-operatively mounted with respect to said belt member.

14. The robotic gripping device of claim 1, wherein said securing member comprises a vertically disposed metal bar.

15. The robotic gripping device of claim 1, wherein said first and second axes of rotation are each oriented substantially horizontally.

16. The robotic gripping device of claim 1, wherein the maximum distance between said horizontally moveable support platform and said hold down plate is selectively adjustable.

17. The robotic gripping device of claim 1, wherein said hold down plate includes a plurality of dynamically actuated entrapment members freely moveable between a lowered position where said entrapment members preclude lateral movement of said package clamped between said hold down plate and said support platform, and a raised position where said entrapment members no longer preclude lateral movement of said package.

18. The robotic gripping device of claim 17, wherein said hold down plate is "+"-shaped.

19. The robotic gripping device of claim 18, wherein said entrapment members are spaced apart by a distance of about 1 cm.

20. The robotic gripping device of claim 17, wherein said entrapment members are ring-shaped and are each loosely retained around a corresponding pin member securely mounted in an opening in said hold down plate.

21. The robotic gripping device of claim 20, wherein said entrapment members are about 5 cm in diameter and about 2 cm in width.

* * * * *